US011603660B2

(12) United States Patent
Anderson et al.

(10) Patent No.: US 11,603,660 B2
(45) Date of Patent: Mar. 14, 2023

(54) STEEP SLOPE ROOFING PANEL SYSTEM AND METHOD

(71) Applicant: Building Materials Investment Corporation, Dallas, TX (US)

(72) Inventors: Eric R. Anderson, Montclair, NJ (US); Walter R. Zarate, Prospect Park, NJ (US)

(73) Assignee: BMIC LLC, Dallas, TX (US)

( * ) Notice: Subject to any disclaimer, the term of this patent is extended or adjusted under 35 U.S.C. 154(b) by 42 days.

(21) Appl. No.: 17/149,810

(22) Filed: Jan. 15, 2021

(65) Prior Publication Data
US 2021/0222432 A1    Jul. 22, 2021

Related U.S. Application Data

(60) Provisional application No. 62/962,634, filed on Jan. 17, 2020.

(51) Int. Cl.
*E04B 7/02* (2006.01)
*E04D 3/369* (2006.01)
(Continued)

(52) U.S. Cl.
CPC ............... *E04B 7/02* (2013.01); *E04D 3/362* (2013.01); *E04D 3/3605* (2013.01); *E04D 3/369* (2013.01)

(58) Field of Classification Search
CPC ......... E04B 7/02; E04D 3/3605; E04D 3/362; E04D 3/369
See application file for complete search history.

(56) References Cited

U.S. PATENT DOCUMENTS 220,181 A  *  9/1879  Slaughter ................ E04D 3/362
                                                    52/531
3,601,947 A     8/1971  Hurd
(Continued)

FOREIGN PATENT DOCUMENTS

| EP | 0204884 A1 | 12/1986 |
| EP | 0550800 A2 | 7/1993 |
| JP | 2003/127092 A2 | 5/2003 |

OTHER PUBLICATIONS

International Search Report and the Written Opinion of the International Searching Authority for PCT/US2021/013648, dated Mar. 31, 2021.

(Continued)

*Primary Examiner* — Patrick J Maestri
(74) *Attorney, Agent, or Firm* — Womble Bond Dickinson (US) LLP

(57) ABSTRACT

A steep slope roofing panel system includes an underlayment and a plurality of roofing panels installed atop the underlayment. The panels may be installed to provide both protection from the environment and watershedding. Alternatively, the panels and the underlayment may share the watershedding functions of the roof, with one as a primary watershedding component and the other as an auxiliary watershedding component. The roofing system may be custom manufactured off-site based upon predetermined measurements and characteristics of a roof and its protrusions. Alternatively, the roofing system may be custom manufactured at the job site based upon such measurements and characteristics. Each panel may be assigned to a location on the roof and may include imprinted instructions regarding cutting and/or bending the panel to form flashing, drip edges, or other features, as well as the panel's location and installation sequence on the roof.

25 Claims, 7 Drawing Sheets

(51) Int. Cl.
*E04D 3/362* (2006.01)
*E04D 3/36* (2006.01)

(56) References Cited

U.S. PATENT DOCUMENTS

| | | | |
|---|---|---|---|
| 3,760,546 A | 9/1973 | Martin et al. | |
| 6,912,822 B2 | 7/2005 | Vos | |
| 7,188,774 B2 | 3/2007 | Pinchen et al. | |
| 7,690,169 B2 | 4/2010 | Saarenko et al. | |
| 7,712,278 B2 | 5/2010 | Lonardi | |
| 7,739,848 B2 | 6/2010 | Trout | |
| 7,748,191 B2 | 7/2010 | Podirsky | |
| 7,900,414 B2 | 3/2011 | Seccombe | |
| 8,028,474 B2 | 10/2011 | Beck et al. | |
| 8,028,475 B2 | 10/2011 | Sigmund et al. | |
| 8,145,578 B2 | 3/2012 | Pershing et al. | |
| 8,316,603 B2 | 11/2012 | Flynn et al. | |
| 8,590,270 B2 | 11/2013 | Martinique | |
| 8,677,709 B2 | 3/2014 | DiLonardo et al. | |
| 8,806,827 B2 | 8/2014 | Perttula et al. | |
| 8,834,993 B2 * | 9/2014 | Yang | C09J 7/241 428/141 |
| 8,863,461 B2 | 10/2014 | Wagner et al. | |
| 8,898,963 B1 | 12/2014 | Amatruda et al. | |
| 8,991,129 B1 | 3/2015 | Kramer | |
| 9,003,733 B1 | 4/2015 | Simpson et al. | |
| 9,091,082 B2 | 7/2015 | Wakebe | |
| 9,206,606 B2 | 12/2015 | Jaks | |
| 9,212,488 B1 * | 12/2015 | McGraw | E04D 5/148 |
| 9,334,652 B2 | 5/2016 | Plath et al. | |
| 9,356,174 B2 | 5/2016 | Duarte et al. | |
| 9,404,262 B1 | 8/2016 | Smith, Jr. | |
| 9,435,125 B2 | 9/2016 | Wakebe | |
| 9,574,351 B2 | 2/2017 | Karr et al. | |
| 9,689,164 B2 | 6/2017 | Rasmussen et al. | |
| 9,708,814 B2 | 7/2017 | Vander Laan et al. | |
| 9,813,016 B2 | 11/2017 | Chabas et al. | |
| 9,919,835 B2 | 3/2018 | Brisendine et al. | |
| 10,196,807 B2 | 2/2019 | Kwong | |
| 10,233,645 B2 | 3/2019 | Izumi et al. | |
| 10,316,519 B2 | 6/2019 | Bogh et al. | |
| 10,422,138 B1 * | 9/2019 | French | D06N 5/006 |
| 10,465,384 B2 | 11/2019 | Bogh et al. | |
| 10,560,048 B2 | 2/2020 | Fisher et al. | |
| 10,590,652 B2 | 3/2020 | Dye et al. | |
| 10,596,612 B2 | 3/2020 | Jordan | |
| 10,612,231 B2 | 4/2020 | Nieminen | |
| 10,808,403 B2 | 10/2020 | Bodwell et al. | |
| 10,817,838 B1 * | 10/2020 | Jalla | G06F 30/10 |
| 10,822,800 B2 | 11/2020 | Kraft | |
| 10,866,012 B2 | 12/2020 | Kvasnicka et al. | |
| 10,876,304 B2 | 12/2020 | Shaw | |
| 10,895,076 B1 | 1/2021 | Folkersen et al. | |
| 10,920,429 B2 | 2/2021 | Shaw | |
| 10,968,634 B2 | 4/2021 | Bolo | |
| 11,025,192 B2 | 6/2021 | Livsey et al. | |
| 11,220,817 B2 | 1/2022 | Hortom | |
| 11,236,510 B2 | 2/2022 | Stephan et al. | |
| 11,248,377 B1 | 2/2022 | Wang et al. | |
| 11,261,603 B2 | 3/2022 | Izumi et al. | |
| 11,447,954 B2 | 9/2022 | McDonald | |
| 2005/0210808 A1 | 9/2005 | Larson et al. | |
| 2006/0037279 A1 | 2/2006 | Onchuck | |
| 2006/0204721 A1 | 9/2006 | Hori et al. | |
| 2008/0262789 A1 | 10/2008 | Pershing et al. | |
| 2010/0296693 A1 | 11/2010 | Thornberry et al. | |
| 2011/0041446 A1 | 2/2011 | Stephens et al. | |
| 2018/0347194 A1 | 12/2018 | Champion | |
| 2019/0100920 A1 | 4/2019 | Krause | |
| 2019/0186139 A1 | 6/2019 | Piltch | |
| 2021/0071410 A1 | 3/2021 | Kralic et al. | |
| 2021/0079655 A1 | 3/2021 | Swaya, Jr. | |
| 2021/0102382 A1 | 4/2021 | Shaw | |
| 2021/0115670 A1 | 4/2021 | Guerra | |
| 2021/0131094 A1 | 5/2021 | Cullen | |
| 2021/0156150 A1 | 5/2021 | Boss et al. | |
| 2021/0222865 A1 | 7/2021 | Beck et al. | |
| 2021/0285218 A1 | 9/2021 | Lowe | |
| 2021/0301534 A1 | 9/2021 | Svec et al. | |
| 2021/0317661 A1 | 10/2021 | Svec et al. | |
| 2021/0317662 A1 | 10/2021 | Svec et al. | |
| 2021/0332539 A1 | 10/2021 | Lee et al. | |
| 2022/0064955 A1 | 3/2022 | Nelson, Jr. | |
| 2022/0173693 A1 | 6/2022 | Atchley et al. | |
| 2022/0298794 A1 | 9/2022 | Tripod | |
| 2022/0307262 A1 | 9/2022 | Humphreys | |

OTHER PUBLICATIONS

S&T Metals; https://www.stmetals.net/commerical-metal-roofing/custom-metal-roofing/; Custom Metal Roofing; Custom Metal Roofing Made right on the Job-site by S&T Metals; dated Dec. 30, 2019.
JMAR Roofing & Sheet Metal; On-Site Roof Panel Manufacturing a Plus; available before Dec. 30, 2019.

\* cited by examiner

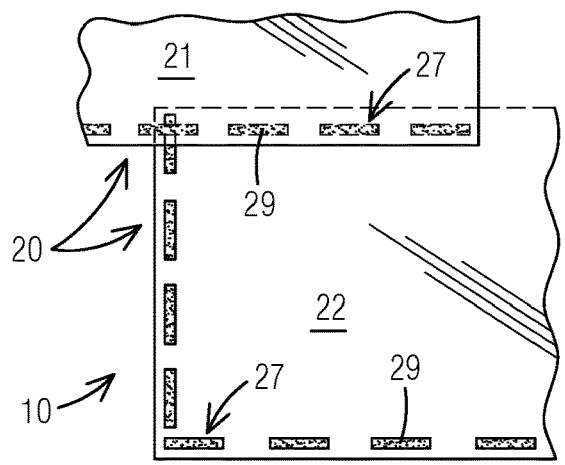
FIG. 4a
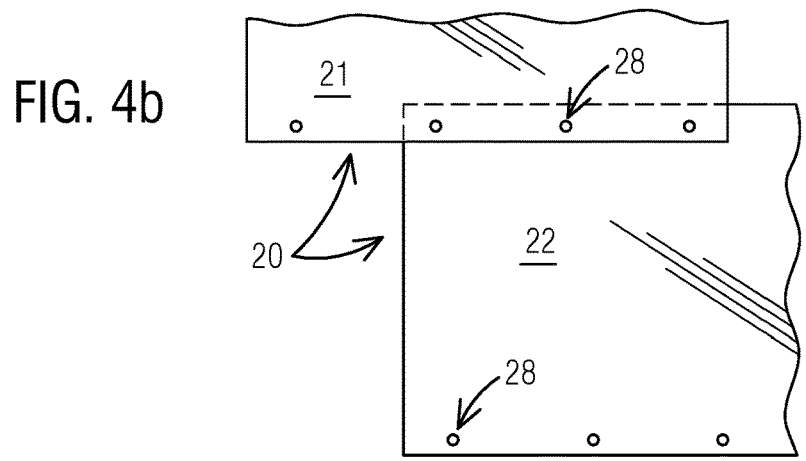
FIG. 4b
FIG. 5
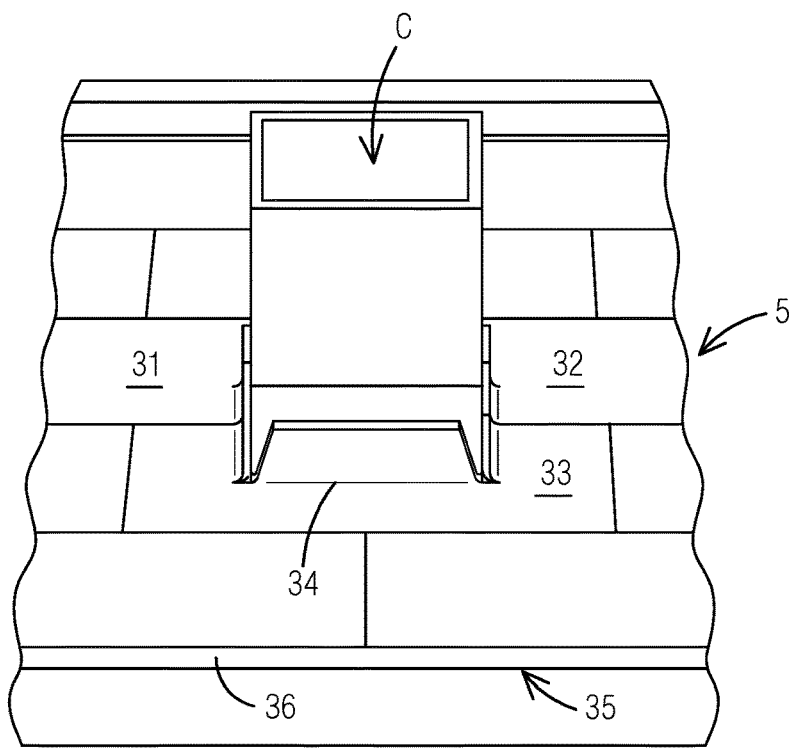

FIG. 6

Manufacture of Panels

|  | Factory | On-Site |
|---|---|---|
| Standardized | Asphalt Shingle Like<br>Panels are manufactured off-site to a standard set of sizes, which are ordered by the contractor and delivered to the site in bundles/pallets<br><br>Regime 1 | Standing Seam Like<br>Panels are manufactured on-site with a continuous set configuration and cut-to-length based on installation needs<br><br>Regime 2 |
| Customized | Pre-Fab Like<br>Panels are manufactured off-site with customized configuration based on installation location and delivered to the site in sequentially identified bundles/pallets<br><br>Regime 3 | Just In Time<br>Panels are manufactured on-site with configuration based on where the panel will be installed in the order of installation<br><br>Regime 4 |

FIG. 7

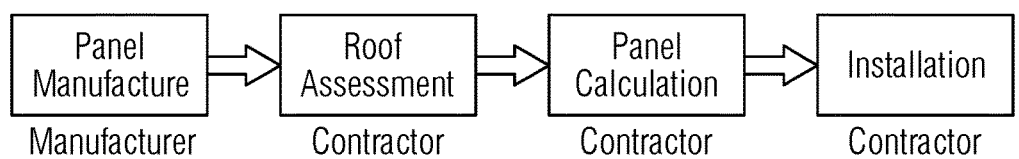

Panel Manufacture (Manufacturer) → Roof Assessment (Contractor) → Panel Calculation (Contractor) → Installation (Contractor)

FIG. 8

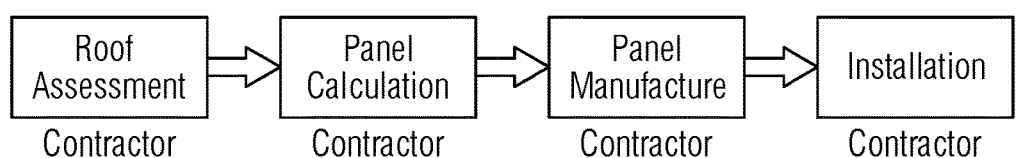

Roof Assessment (Contractor) → Panel Calculation (Contractor) → Panel Manufacture (Contractor) → Installation (Contractor)

STEEP SLOPE ROOFING PANEL SYSTEM AND METHOD

REFERENCE TO RELATED APPLICATION

The present patent application claims the benefit of U.S. Provisional Application No. 62/962,634, filed Jan. 17, 2020.

INCORPORATION BY REFERENCE

The disclosures made in U.S. Provisional Application No. 62/962,634, filed Jan. 17, 2020, are specifically incorporated by reference herein as if set forth in their entirety.

TECHNICAL FIELD

This disclosure relates generally to residential roofing systems and more specifically to roofing systems utilizing designed and manufactured panels fabricated on site or off site based upon the geometry and/or configuration of the roof to be constructed.

BACKGROUND

Many existing steep-slope roofing systems require multiple layers of redundant material or overly with complicated geometric features to create the primary water-shedding surface of the roof.

SUMMARY

Briefly described, the roofing systems as embodied in the examples disclosed herein comprise a series of roofing components that enable customization of the manufacture of such roofing components to match a roof geometry and other factors, and, when installed as detailed below, provides water-shedding capability to steep-sloped roofs (for example, but without limitation, 2:12 and steeper) and protects the interior of a roofed structure from water infiltration. The roofing system may include an underlayment and a plurality of overlying roofing panel components (hereinafter "roofing panels"). The roofing panels and/or the underlayment are configured to make up the primary water-shedding feature of an installed roofing system, and further can include protective coatings or layers, such as a UV and a weather or impact resistant protective layer, applied thereafter. Options for attaching the water-shedding components to the underlying roof structure and options for attaching water-shedding components to each other also are disclosed.

In some aspects the roofing panels may be custom manufactured for the size and shape of a specific roof and its protrusions. In some embodiments, manufacturing of the roofing panels can be done off site, based on an assessment of a roof geometry, including roof measurements such as length, width, pitch and other measurements, or can be done on-site, in the field in real time during installation, such as by the use of mobile manufacturing equipment. For example, in some embodiments, the roofing panels can be manufactured and shipped as a kit or roofing assembly including a quantity of pre-measured and custom manufactured panels that can be provided with instructions for their location or positioning along the roof. In some embodiments, such custom roofing panels also may be printed with specific installation instructions such as where they should be installed on the roof and in what sequence and how they should be cut and bent to form integral flashing and drip edge features. In further embodiments, the roofing panels also can have adhesive strips or other connectors applied along a bottom or lower surface thereof, and which are configured to attach and/or seal peripheral edges of the roofing panels to adjacent roofing panels during installation on a roof.

Aspects of the present disclosure may include, without limitation, a roofing panel system comprising a plurality of roofing panels configured to be formed in accordance with an assessment of a roof geometry, including parameters or features of the roof such as pitch, length, width, location and sizes of obstructions, etc.; and installed in courses on a roof with each panel overlapping at least one other panel and with adhesive and/or sealant disposed in regions of overlap. In embodiments, the roofing panels can be custom formed to a size and/or configuration in view of the assessed geometry of the roof on which the roofing panels are installed.

In additional embodiments, an underlayment can be positioned along or disposable below a lower surface of the roofing panels as part of their assembly on a roof structure to form a roof. In some further non-limiting embodiments, the roofing panels can provide a primary water shedding function for the assembled or installed roof. In other embodiments, the underlayment can provide the primary watershedding function.

In embodiments, the roofing panels, when installed, can overlap horizontally adjacent panels in a course at their side edges; and/or can overlap vertically adjacent panels in a next lower course at their forward edges. The roofing panels further can be installed and/or attached in series using adhesive and/or sealant materials disposed between roofing panels in the areas of overlap. In still further embodiments, the adhesive and/or sealant material is configured as a continuous or substantially continuous strip. For example, in embodiments, the adhesive and/or sealant is configured as a discontinuous strip and further comprising an underlayment below the plurality of roofing panels to provide a primary watershedding function.

In other embodiments of the roofing system, the roofing panels may be cut and bent to form integral water shedding features that conform to protrusions and edges of a roof. For example, the roofing panels can include a deformable material, such as metal or polymers, that can be formed to shape in the field by an installer. In addition, in embodiments, the roofing panels can be marked with instructions to an installer.

In one aspect of the present disclosure, a roof system comprises a deck; a plurality of panels positioned on the deck; each panels comprising an upper surface, a lower surface a plurality of peripheral edges, and adhesive strips positioned along the lower surface. The panels are configured to be installed on the deck in predetermined positions based, at least in part, upon a roof geometry and at least one of a design requirement, a building code requirement, an installation practice, or combinations thereof.

In embodiments of the roof system, the panels are configured to be installed on the deck in overlapping courses with the adhesive strips of the panels disposed in regions of overlap between adjacent panels of the overlapping courses and configured to secure the adjacent panels and reduce migration of water between the adjacent panels. In other embodiments, the roof system can include instructions identifying a position at which each panel of the plurality of panels is to be installed on the deck. In still further embodiments, the instructions are applied along the lower surface of at least one of the plurality of panels.

In another aspect, the disclosure includes a method comprising the steps of obtaining a geometry of a roof, including a length, width and pitch of the roof; generating a plurality of panel dispositions for constructing the roof based, at least in part, upon the geometry of the roof and at least one of a design requirement, a building code requirement, installation practice, or combinations thereof; generating a plurality of panels, each of the panels configured to be installed based, at least in part, on a corresponding one of the generated panel dispositions; and generating instructions for installation of each of the panels at each of the plurality of panel dispositions to form the roof.

In embodiments, the method further can include applying the instructions for installation of each panel on the roof along a lower surface of at least one of the plurality of panels. In addition, the method can include generating a plurality of panel dispositions comprises determining a quantity of panels for constructing the roof and determining a panel position for each panel along the roof. In addition, generating the plurality of panels can include obtaining a supply of panel material and forming the plurality of panels. In still other embodiments, the forming the plurality of panels is conducted at a site of installation of the roof.

In still further aspects, a roof assembly kit is provided, the roof assembly kit comprising a plurality of roofing panels, each roofing panel comprising an upper surface; a lower surface; and a plurality of peripheral edges. The plurality of roofing panels are configured to be installed to form a roof in accordance with an assessment of a geometry for the roof; and instructions for installation of each roofing panel of the plurality of roofing panels at a predetermined position on the roof based, at least in part, upon the geometry of the roof and at least one of a building code requirement, a design requirement, an installation practice, or combinations thereof.

In some embodiments of the roof assembly kit, the instructions for installation of each of roofing panel is applied along a lower surface of at least one of the plurality of panels. In embodiments, at least one self-seal strip can be positioned along the lower surface of each roofing panel adjacent a peripheral edge thereof; the at least one self-seal strip configured to attach the roofing panel to an upper surface of an adjacent roofing panel. In other embodiments of the roof assembly kit, each roofing panel comprises a flexible metal or polymer sheet material. The flexible metal or polymer sheet material further can be configured to be sized for installation on the roof. In some embodiments, at least some of the plurality of roofing panels are sized at a site of installation of the roof.

In still other embodiments of the roof assembly kit, at least a portion of the plurality of roofing panels comprise quantity roofing panels formed with predetermined standard roofing panel configurations. In further embodiments of the roof assembly kit, the quantity of roofing panels and position of each panel of the plurality of roofing panels is determined based, at least in part, on the geometry of the roof.

The foregoing and other advantages and aspects of the embodiments of the present disclosure will become apparent and more readily appreciated from the following detailed description and the claims, taken in conjunction with the accompanying drawings. Moreover, it is to be understood that both the foregoing summary of the disclosure and the following detailed description are exemplary and intended to provide further explanation without limiting the scope of the disclosure.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

FIG. 4a is an isometric view showing overlapping panels with discontinuous sealant strips according to embodiments of the present disclosure.

FIG. 4b is an isometric view showing overlapping panels secured to a roof deck and to each other by visible and covered fasteners.

FIG. 5 is a perspective view showing panels bent to form integrated flashing and drip edges according to embodiments of the present disclosure.

FIG. 6 is a table showing four embodiments of regimes for manufacturing roofing panels of the present disclosure both off site and on site.

FIG. 7 is a workflow chart illustrating manufacturing and installation of a roofing panel system according to regime 1 of FIG. 6.

FIG. 8 is a workflow chart illustrating manufacturing and installation of a roofing panel system according to regime 2 of FIG. 6.

DETAILED DESCRIPTION

Example embodiments of the present disclosure will now be described in more detail with reference to the above described drawing figures. In general, embodiments of the roofing panel system 10 are divided into two configuration categories. Category 1 configurations generally exemplify roofing systems in which the primary watershedding function and the protective and weathering function are provided by surfaces on the same components. In category 2 configurations, the primary watershedding function and the weathering function may not be provided by surfaces of the same components.

For this disclosure, a weathering surface includes a surface of any component of the roofing system that is fully or partially exposed directly to the outside environment when the system is fully installed. A primary watershedding surface includes a surface of one or more components configured for diverting water that falls on the weathering surface away from the underlying roof structure. If a component surface or a combination of component surfaces enables and/or allows a path for water (e.g. rain, snow, ice . . . ) falling on the weathering surface to penetrate, that component surface or combination of component surfaces generally is not considered a primary watershedding surface.

An auxiliary water-shedding surface includes a component surface or a combination of component surfaces that either partially diverts water away from the underlying roof structure (i.e. flows of water falling on the roof are diverted away from the underlying roof structure by the auxiliary watershedding surface, but pathways may still exist for water to penetrate), or provides additional watershedding capacity behind or below a component surface to provide the primary water-shedding function.

A category 1 embodiment may be characterized by a roofing system comprising a sealing or non-sealing underlayment that can be either fully adhered or mechanically attached to the roofing structure. Such an underlayment can act as an auxiliary watershedding layer. The system may further comprise a plurality of thin, flat roofing panels installed on top of the underlayment layer. In embodiments, the roofing panels can be rectangular, square, polygonal, and/or a variety of other configurations. In embodiments, the roofing panels can be installed in arrays or courses. For example, the roofing panels can be installed in a series of overlapping courses such as indicated in FIGS. 1-4*b*, with a lower horizontal edge of an upper roofing panel overlapping an upper horizontal edge of a roofing panel or series of panels in a next lower course of roofing panels. Adhesive strips or other patterned sealant materials can be provided to seal all overlapping portions of adjacent panels together.

Figure 1:
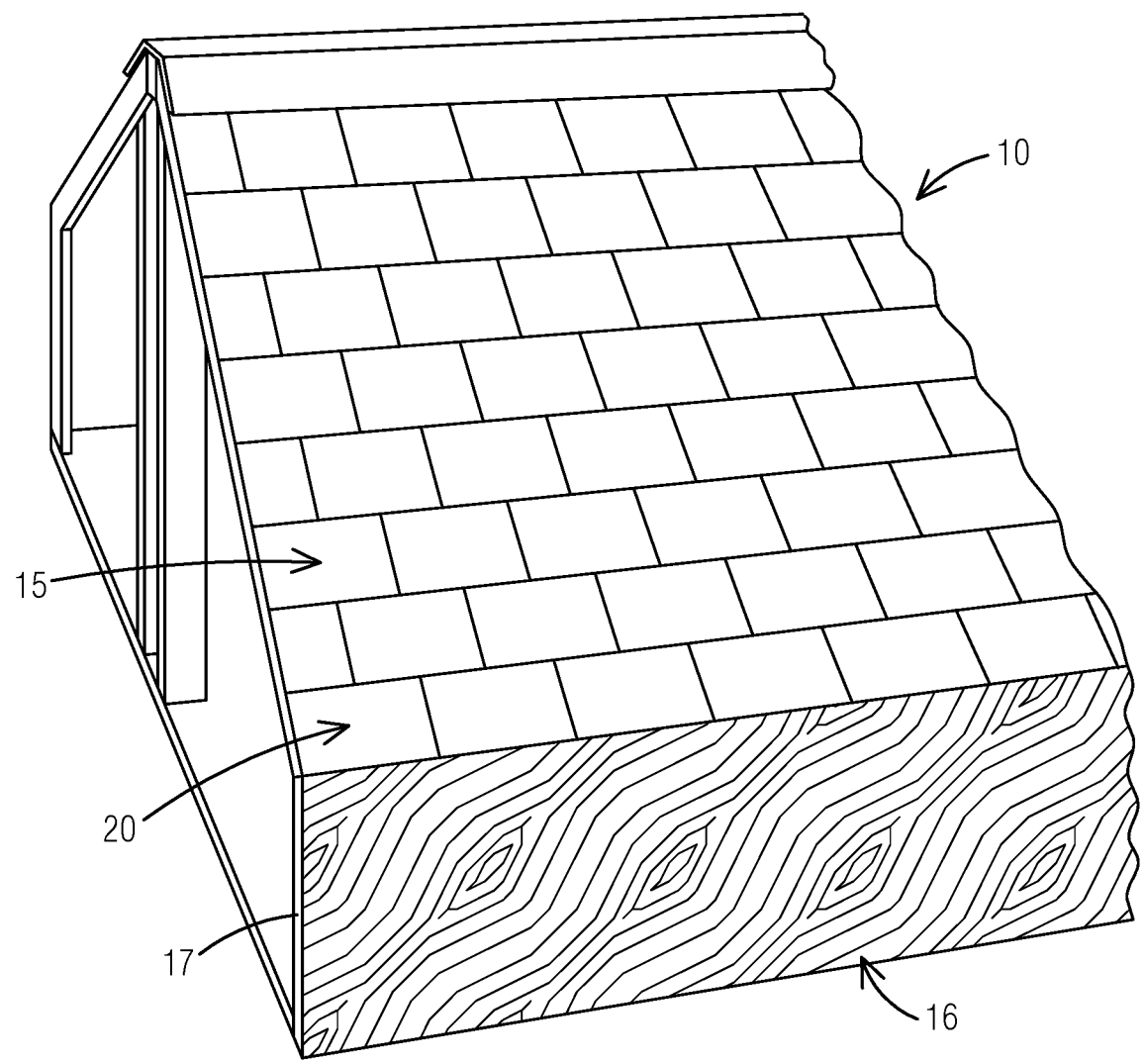
FIG. 1 is a perspective view of a section of a roofing system applied to a roof according to embodiments of the present disclosure.

In embodiments, a substantially continuous sealant or adhesive strip or set of strips, dots, dashes or other sealant/adhesive applications can be positioned between roofing panels in regions where the panels overlap, which will serve to attach windward edges of roofing panels to adjacent panels. The overlaps, in conjunction with the adhesive strips, result in a roofing panel surface that provides a primary watershedding function as well as a weathering function. Installation according to standard shingling practices (for example, but without limitation, double overlap vertically adjacent panels in consecutive courses and no overlap of horizontally adjacent panels) generally fall into category 1. FIG. 1 shows an example category 1 roofing panel system 10 installed in traditional shingle style, with nails and adhesive strips as the attachment means to secure roofing panels 20 in courses or in array 15 along a roofing deck or substrate 16 of a roofing structure 17. The resulting exposed weathering surface in this example is printed to imitate a traditional slate roofing material.

Figure 2:
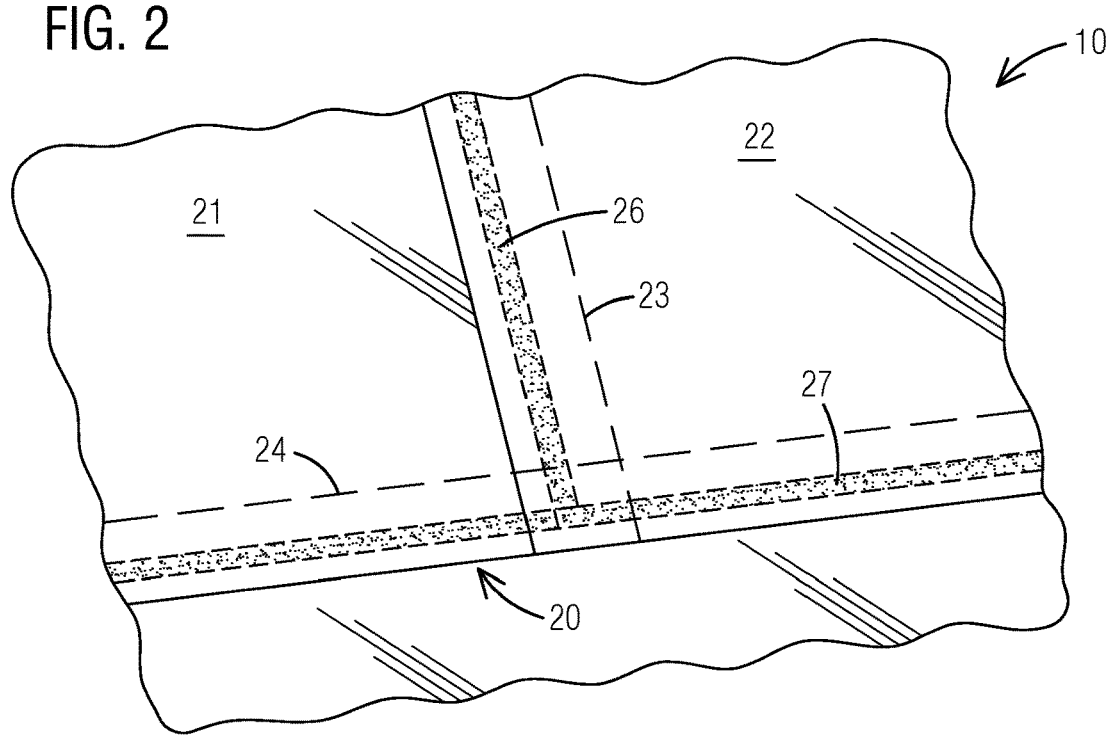
FIG. 2 is an isometric view showing overlapping roofing panels according to embodiments of the present disclosure.

FIG. 2 shows an example embodiment of the category 1 roofing panels installation of FIG. 1. In FIG. 2 panels 21 and 22 are horizontally adjacent in one course and panel 20 is an offset vertically adjacent panel in a next lower course. Panels 21 and 22 overlap at their respective side edges as indicated at 23 and both overlap panel 20 along their forward edges as indicated at 24. An adhesive and/or sealant strip 26 is disposed between the overlapping portions of panels 21 and 22 and an adhesive and/or sealant strip 27 is disposed between portions of panels 21 and 22 that overlap panel 20. Fasteners such as nails 28 (FIG. 3) above the adhesive strip 27 may attach the panels to an underlying roof structure. All edges of the panels are secured to adjacent panels by the adhesive and/or sealant to prevent water penetration between horizontally adjacent panels and vertically adjacent panels. Thus, the roofing panels themselves can provide the weathering function and the primary watershedding function.

Figure 3:
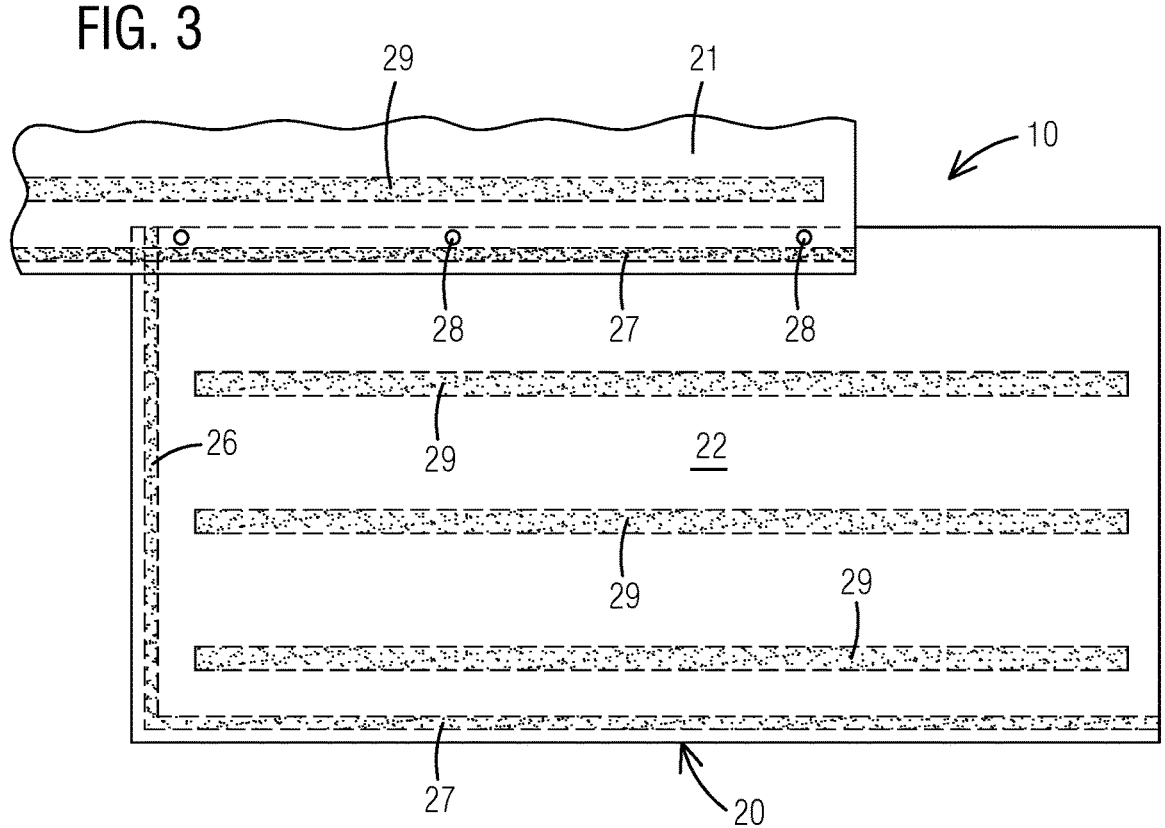
FIG. 3 is an isometric view showing overlapping panels according to embodiments of the present disclosure.

FIG. 3 illustrates the panel installation configuration of FIG. 2 with the addition of intermediate adhesive and/or sealant strips 29 along the backs of the panels to attach the panels to the underlayment layer. Panels may be attached using mechanical fastening (nails, screws, clips, etc.) 28, mechanical surface treatment, adhesive such as strips 29 covering the back of the panel either fully or partially, or by other attachment mechanisms. Such other attachment mechanisms may be built into the underlayment layer and may include for example magnetic strips for attaching metal panels, complimentary reactive surface chemistry, hook-and-loop fasteners, and mechanical snaps to name a few. For mechanically attached systems in which the mechanical attachment (e.g. fasteners such as nails, screws, etc.) passes through the panel such as nails 28, the mechanical attachments are located such that they are covered by the overlapping of the panels and either behind or fully encompassed by the adhesive strip. The width of overlap and adhesive strip is determined by the fastening method, panel size, and wind performance requirements.

A category 2 system embodiment generally is similar to a system in category 1 except that the underlayment selected will be configures to be capable of sealing joints between courses of underlayment and around penetrations. In embodiments, the underlayment provides the primary watershedding function, and the panels are not continuously sealed where they overlap. The roofing panels may be face-nailed at the overlaps as an alternative fastening method between adjacent roofing panels 21/22 and from the roofing panel to roof structure. In this case the panels act as an auxiliary water-shedding surface and the weathering and environmental protective layer for the primary water-shedding surface, which is the underlayment. Such a category 2 system is illustrated in FIGS. 4*a* and 4*b*. FIG. 4*a* illustrates the use of discontinuous adhesive and/or sealant strips between overlapping edges of panels and FIG. 4*b* illustrates the use of exposed fasteners along windward edges of panels. In each case, pathways exist for water to penetrate the panels and the underlayment provides the primary water shedding function.

In some embodiments, the roofing panels of both categories can be flat, thin, and rectangular to facilitate ease of installation, alignment, and in situ forming around obstructions. Other configurations, such as square, trapezoidal, polygonal, or other configurations can also be provided. The simplicity of the roofing panel geometry further will be selected to enable an installer to easily cut, bend, and otherwise form the panel as needed to flash against obstructions in the roof plane such as chimneys, vertical walls, pitch changes, eaves, and rakes. This eliminates the necessity for additional water shedding or flashing components around such obstructions. When compared with asphaltic shingle installations for example, roofing panels of the present disclosure eliminate the need for separate step flashing and separate drip edge components.

FIG. 5 shows an embodiment at the roofing panel system installed around a protruding chimney C on a roof 5. Panels 31, 32, and 33 that intersect the chimney are simply cut and bent as indicated at 34 to form panel sections that extend partially up the faces of the chimney. In this aspect, the roofing panels themselves can provide the function of flashing around the chimney and the flashing is integral to the panels once cut and bent. This can reduce the possibility of leaks around the chimney and, more importantly, eliminates the need for auxiliary flashing and counter flashing components around the chimney. FIG. 5 also shows that roofing panels along an eave (or rake) edge 35 are simply bent downwardly to form an integral drip edge 36 along roof terminations.

Panel material selection for both categories of roofing systems 10 generally is dictated by the durability of the material under the expected environment over the target design life of the particular embodiment, the ability of the material to be formed into durable thin sheets, and the ability of the material to deform plastically without breaking, cracking, or otherwise losing integrity. Possible panel materials may include, but are not limited to metals such as zinc, copper, aluminum, stainless steel, galvanized steel, and painted or otherwise coated steel; sandwich composites such as vibration damped steel; polymer film and sheet composites; polymers; and rubber such as recycled tire rubber to name a few. Any material that meets the above requirements should be considered to fall within the scope of the roofing system of the present disclosure as exemplified herein.

Manufacturing Regimes

FIG. 6 illustrates four regimes for manufacturing roofing panels according to embodiments of the present disclosures. In embodiments, the roofing panels 21/22 of the roofing panel systems 10 may be manufactured and delivered to market according to one of the four regimes. Each regime integrates different levels of roofing knowledge and practice into the panel and relies on the contractor's skill to varying degrees in the different steps of the roof installation process.

FIGS. 6 and 7 show an embodiment of a workflow from manufacture through installation of a roofing panel system according to regime 1. In this regime, a stock of standardized panels is produced to standard set of sizes and provided to the contractor in bundles, pallets or other stacking system. In some embodiments, the standardized panels are provided before knowing the details of a roof on which the system is to be installed. This manufacture and installation regime is closest to the practice currently implemented for asphaltic roofing products for example. Regime 1 lends itself to manufacture and installation of the roofing panel system with some benefits, though not all of the benefits, afforded by the roofing panel system of the present disclosure. Roofing panels produced under this regime 1 still can be manipulated by the installer to integrate flashing and drip edge components into the panel during installation.

With regime 1, an installer may only need to provide general or somewhat simple estimates of a roof geometry to calculate the quantity of standard roofing panels required. The contractor is responsible for roof assessment, panel calculation, and installation FIGS. 6 and 8 show workflow from manufacture through installation of a roofing panel system according to regime 2. Regime 2, however, moves the production of the panels from an offsite factory to the job site. This changes the manufacturing and installation workflow as shown in FIG. 8. As in regime 1, the roof assessment step can be a general or somewhat simple estimation of the roof geometry only used to estimate a material quantity of roofing panels. Panel calculation further relies on the skill of the contractor to make ad hoc design decisions. In this embodiment or regime, a supply of panel material and/or other materials, such as adhesive or sealant strip materials will be provided, together with, mobile or portable manufacturing equipment or systems (e.g. measuring, cutting and forming equipment) will be provided onsite for manufacture of the panels in the field. In addition, or alternatively, a series or set of standard size or configuration panels also can be provided, without having to provide a supply or master roll of panel material in the field.

In addition, since panels are manufactured onsite as needed, the manufacturing equipment operator can interact with installers to provide panels with the required length and cutoff angle as required. Manufacturing to length as required can reduce waste and help resolve some logistics issues. For example, sufficient quantities of panels are guaranteed and damaged panels can be re-manufactured immediately. Also, aspects of the manufacture and installation process fall on the contractor, with the manufacturer generally being responsible for providing the manufacturing equipment and raw materials.

Figure 9:
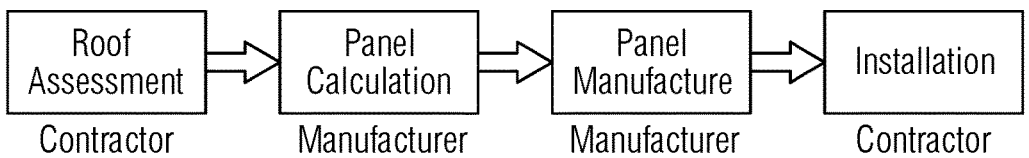
FIG. 9 is a workflow chart illustrating manufacturing and installation of a roofing panel system according to regime 3 of FIG. 6.

FIGS. 6 and 9 show workflow from manufacture through installation of a roofing panel system according to regime 3. Regime 3 covers custom panels manufactured off-site and shipped to a job-site. This regime generally requires a more precise assessment of the geometry of the roof in advance because the panel calculation step is performed by the panel manufacturer. Roofing panels are then custom manufactured to substantially match the roof geometry and each panel may be assigned to a specific location on the roof and the panels may require a specific installation sequence. For example, the assessment of the roof geometry generally will include determination of a length, width, pitch, and locations of obstructions such as a chimney, pipes, sky-lights, etc. . . . .

The panel requirements for regime 3 are determined and optimized for installation at a specific location on a specific roof. Regime 3 facilitates standardization of roofing best practices rather than relying on the expertise of the installer by centralizing the roofing know-how and implementing it into the product directly. In this regime, the manufacturer generally can be responsible for the panel calculation and panel manufacture while the contractor is responsible for the roof assessment and installation.

Figure 10:
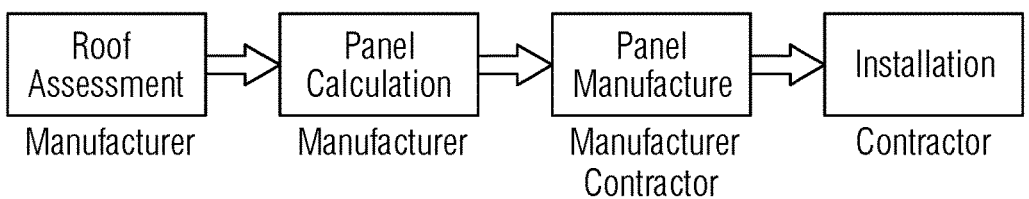
FIG. 10 is a workflow chart illustrating manufacturing and installation of a roofing panel system according to regime 4 of FIG. 6.

FIGS. 6 and 10 illustrate workflow from manufacture through installation of a roofing panel system according to regime 4. Regime 4 is the similar to Regime 3 except that the means of manufacturing the panels is portable and available on-site. In this regime, the installer receives the panel raw materials such as coils and adhesives such that the panels can be installed and customized, as required, on site. For example, in this embodiment or regime, a supply of panel material and other materials, such as adhesive or sealant strip materials will be provided, together with, mobile or portable manufacturing equipment or systems (e.g. measuring, cutting and forming equipment) will be provided onsite for manufacture of the panels in the field. In addition, the panel calculation and manufacture may be controlled by the off-site manufacturer or the installer/contractor. The on-site production, however, allows the contractor to customize panels if needed.

Roof Assessment

Roof assessment may be conducted by the contractor or by another qualified evaluator using methods capable of providing roof detail sufficient for a given regime. Methods of assessment may include manual measurement, image analysis (ground or satellite based), drone-based measurements, some combination thereof, or any other method capable of providing the necessary roof details for a given regimes' panel calculation step. For regimes 1 and 2, measurements need only be sufficient to calculate a quantity of material required for the installation since the disposition of individual panels is left to the installer. An estimate of the surface area of each roofing plane on the site may be sufficient for regime 1 and 2. Regimes 3 and 4 require more precise assessment of the roof since both panel quantity and each panel's location on the roof will be calculated in the panel calculation step. In addition to the measurements of each roof plane, assessments should include position and geometry of penetrations (skylights, chimneys, etc.), roof plane pitches, roof plane edge conditions (eave, rake, valley, vertical wall, ridge, etc.), job site location and building orientation. Roof assessment data should be sufficient to produce an accurate representation of the roof.

Panel Calculation

For regimes 1 and 2, panel calculation involves calculating the quantity of material required for the installation i.e. the required number of panels for regime 1 and coil length for regime 2. Such calculations should take into account the required overlaps and material widths and should include a waste factor to account for damaged panels, or other unforeseen issues on the job site. Both regimes 1 and 2 generally leave calculation of individual panel disposition (position on roof, installation order, cutouts, panel length, fastener number and location, etc.) for the installer to determine during the installation process.

For regimes 3 and 4, the information gathered in the roof assessment phase is used to determine both the quantity of panels and the disposition or positioning of each individual panel for Regime 3, and further the coil length and adhesive requirements for Regime 4. Disposition in this case indicates the specific location of the panel along the roof plane(s), according to the required geometry of the panel based on its location relative to roof plane edges or obstructions, the required number and location of fasteners or other fixation means, and the individual panel's place in the installation sequence.

Using the information gathered from the roof assessment phase, along with specified design rules (e.g. design trends or industry practices), local building code requirements, and installation best practices or requirements (e.g. installation practices, accommodating factors such as weather, region of the country, particularities of the installations/job-site, and/or other factors as will be understood by persons skilled in the art), the panel disposition may be defined either manually or programmatically via a panel disposition calculation algorithm. By implementing consensus design rules, installation best practices or requirements, and local building code requirements into the calculation algorithm, much of the knowledge typically required for a successful roofing installation is integrated into the panel rather than relying on the experience and knowhow of the installer. This increases the available labor pool and ensures consistency of installation quality.

Figure 11:
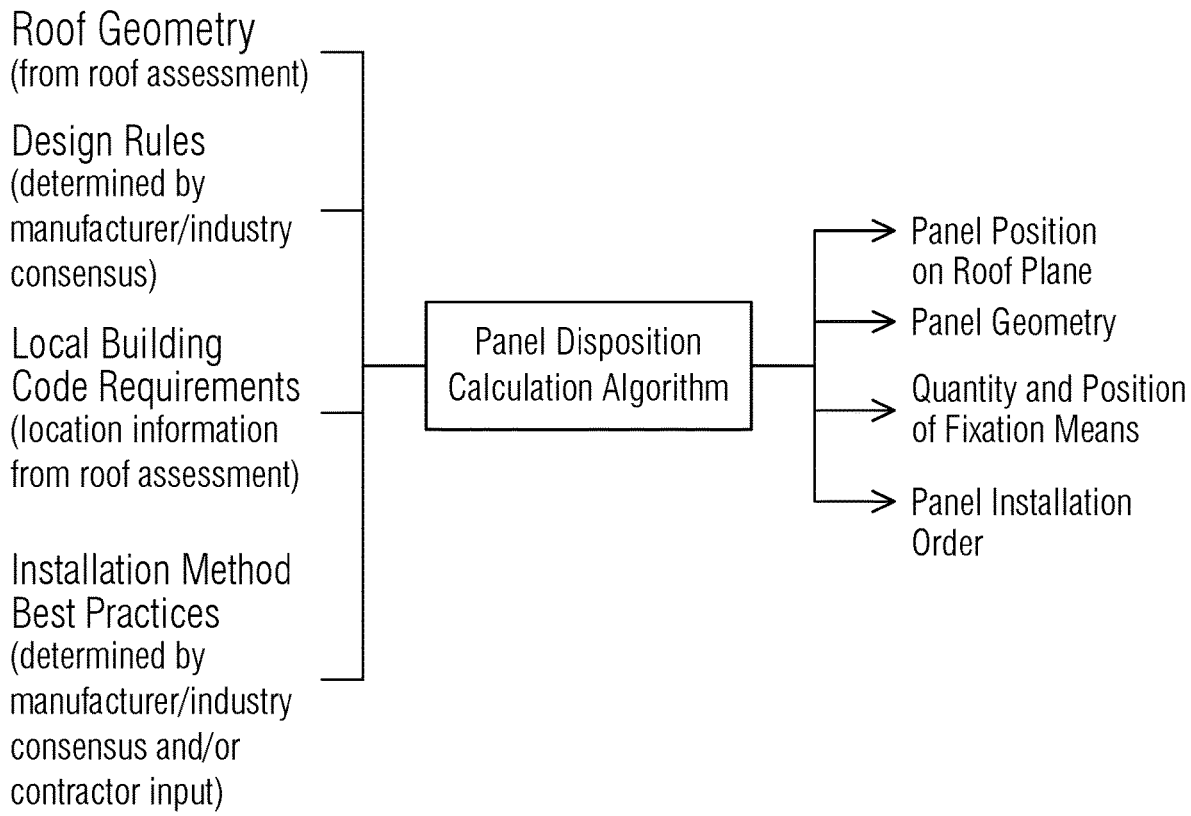
FIG. 11 is a flowchart showing inputs and outputs of a panel disposition calculation algorithm according to embodiments of the present disclosure.
Figure 12:
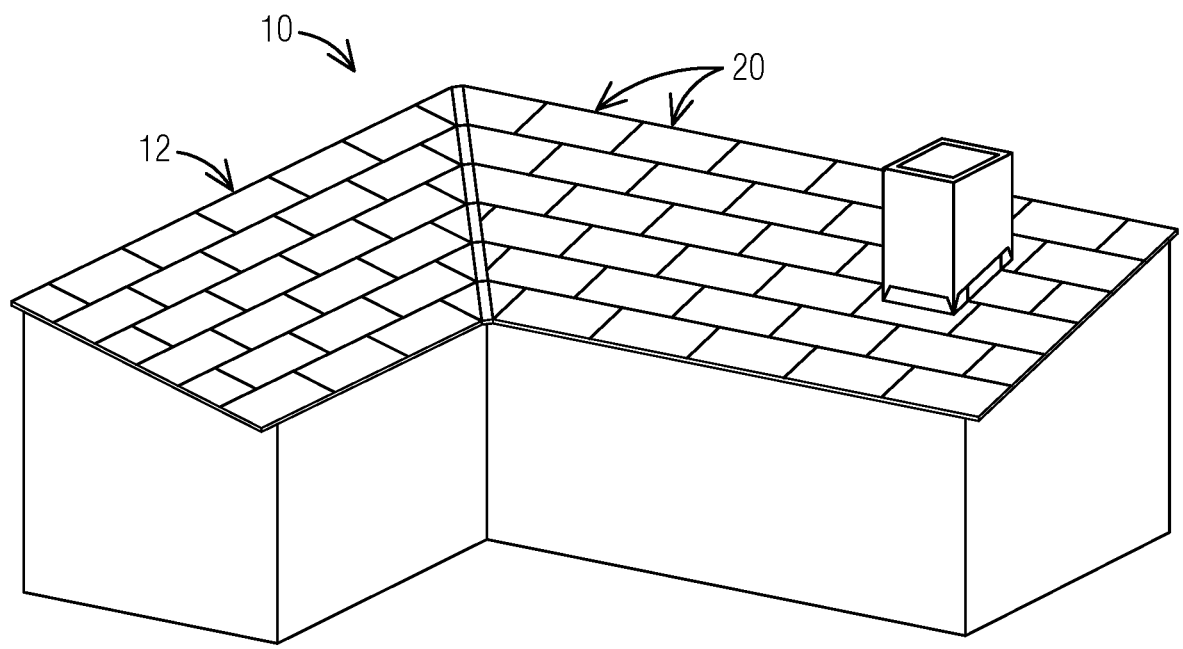
FIG. 12 is a perspective view showing a digital representation of the roof of a house incorporating a roofing panel system according to embodiments of the present disclosure.

FIG. 11 illustrates a non-limiting embodiment of inputs and outputs of a panel disposition calculation algorithm or system according to an embodiment of the roofing system of the present disclosure. The algorithm or system may produce a digital representation of a specific roof R showing the disposition of all roofing panels of the installation according to inputs from the roof assessment. This is illustrated in one embodiment in FIG. 12. In other embodiments, a map or diagram, and/or a series of instructions illustrating or detailing location, placement, or positioning of each panel or sets or groups of panels can be provided. Still further, such instructions also can include directions or indicators as to placement of fasteners of connectors for securing the roofing panels to adjacent roofing panels, for bending, cutting or otherwise manipulating portions of the roofing panels, such as to form a drip edge or other features.

Panel Manufacture

A non-limiting embodiment of the present disclosure utilizes a continuous manufacturing process suitable for all four regimes. In this process, a supply or continuous master roll of the panel material is processed either in a factory or on site to produce finished panels. In all regimes, the process includes a decoiling step to remove material from the supply or master roll; a flattening step to remove any residual coil-induced curvature; an in-line adhesive or sealant application step to apply adhesive in the decoiling direction; an optional cross web sealant or adhesive application step for panel configurations that require sealant along a cut edge; and a cut-to-length step to remove the panel from the continuous coil and complete the production process.

Figure 13:
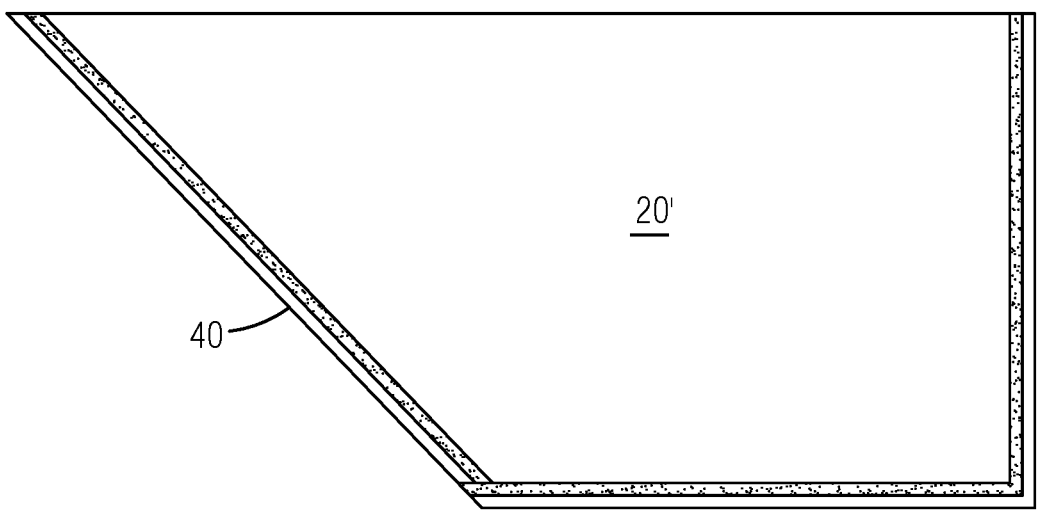
FIG. 13 is a top plan view of a trapezoidal roofing panel for abutting a valley according to embodiments of the present disclosure.

Panel length is determined by the amount of material passed through the process before the cut-to-length shear is activated. For panels in regime 1, the length will be constant while for the other 3 regimes the length is adjusted as needed to create panels of required length based on the roof assessment process. This reduces the amount of waste generated during installation. If, for example, a 38" long panel is required for a position in the installation, a 38" long panel is cut from the supply or master roll. This contrasts starkly with cutting a 48" panel from the master roll then cutting it down to 38" during installation. Manufacturing panels in regimes 3 and 4 also includes adjustability of the angle of the cut-to-length cut relative to the coil direction to account for non-orthogonal roof plane edges such as at hips and valleys. FIG. 13, for example, shows a custom cut valley panel 20 with a non-orthogonal edge 40 that is configured to abut a valley during installation.

Some panel configurations require application of sealant and/or adhesive across the width of the web and/or along the height of the panel. In regime 3 and 4 the application of cross-web sealant will track with the adjustable angle of the cut-to-length cut to ensure non-orthogonal edges can be properly secured and sealed. This can reduce the need for additional sealant application during the installation process. Also, for regimes 3 and 4 roofing panels, the offset between the cut edges of the panels and the sealant application location is controlled by the panel disposition algorithm to account for panels that need additional forming steps such as panels for rake edges, drip edges, vertical wall flashing, protrusion flashing, and the like.

Category 1 panels in all regimes will include either a continuous or discontinuous sealant and/or adhesive applied along the lower or exposure edge of the panel. For regimes 3 and 4, additional continuous or discontinuous adhesive stripes may be applied above the first sealant and/or adhesive stripe as determined by the panel disposition algorithm based on installation location on the roof plane. For example, higher wind uplift resistance may be required around edges of roof planes. Additionally, the vertical position of the first stripe and/or adhesive may be adjusted or offset from the forward edge of a panel if the panel location relative to an edge of the roof plane requires additional forming steps such as bending for eave edges, roof protrusions, and the like.

Panels in regimes 3 and 4 may also include a marking step during which panels are permanently or non-permanently marked with installation information. Markings may indicate many things including, without limitation, panel type; relative position of panel on the roof (e.g. course and column); absolute position of panel (e.g. relative to a specific point on the roof plane); cut and bend lines for components that will interact with roof obstructions (e.g. chimneys, pitch changes, dormers, and the like); installation order number; assigned roof plane; alignment marks for horizontal or vertical offset; fastener positions; installation date; and contractor name.

Permanent markings providing instructions for installation, such as matching the panels, their position along the roof, overlaps, etc., if included, can be located in areas where the panels are overlapped to hide the markings after installation. Non-permanent markings may be applied to the portion of the panel exposed after installation using a marking material that weathers off or may be otherwise removed (e.g. water-soluble ink), or made not to interfere with the aesthetic of the roof (e.g. disappearing ink and UV ink). Panel markings are an output of the panel disposition algorithm. The markings simplify the installation by directing the installer and the instructions are customized for a specific roof and available on each panel. The result is a reduction in the skill level required to deliver a correctly installed roofing system.

In some non-limiting embodiments, the roofing panels, such as roofing panels manufactured in accordance with regimes 1 or 3 of FIGS. 6, 7 and 9, can be provided as a kit or pre-manufactured roofing assembly. Such a roofing assembly can include a quantity of roofing panels determined based upon an assessment of the roof geometry, including length, width, pitch and other factors such as placement of obstructions, and packaged together and shipped to a job-site for assembly on a building structure. In some instances, such as where the quantity of roofing panels includes a series or one or more sets of standard sized panels, instructions can be provided to the installer(s) for cutting, bending or otherwise shaping the panels to match the roof geometry. In other instances, such as for roofing panels that are custom manufactured as indicated in FIGS. 6, 9 and 11, instructions can be provided (including in some embodiments being printed along the panels themselves) the indicate position or placement of the roofing panels along the roof, as well as indicating where the installer should bend, cut or otherwise manipulate the panels to match the roof.

Figure 14:
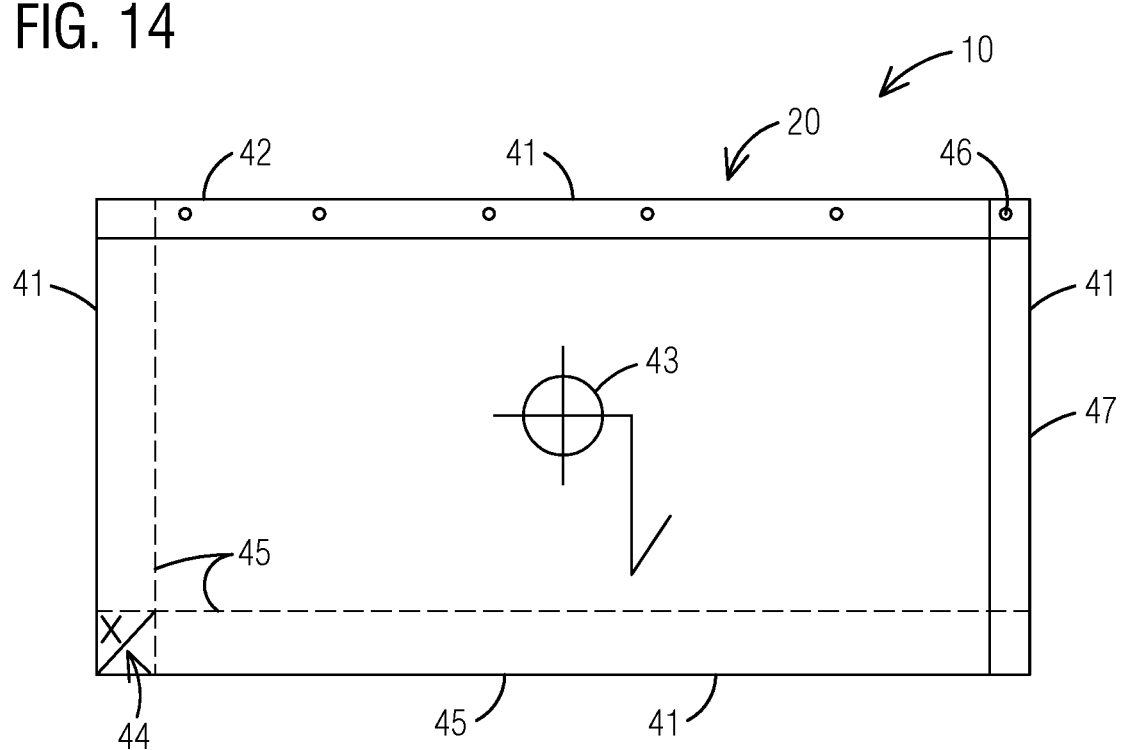
FIG. 14 is a top plan view of a roofing panel for a specific location on a roof and incorporating installation instructions applicable to that specific location.
Figure 15:
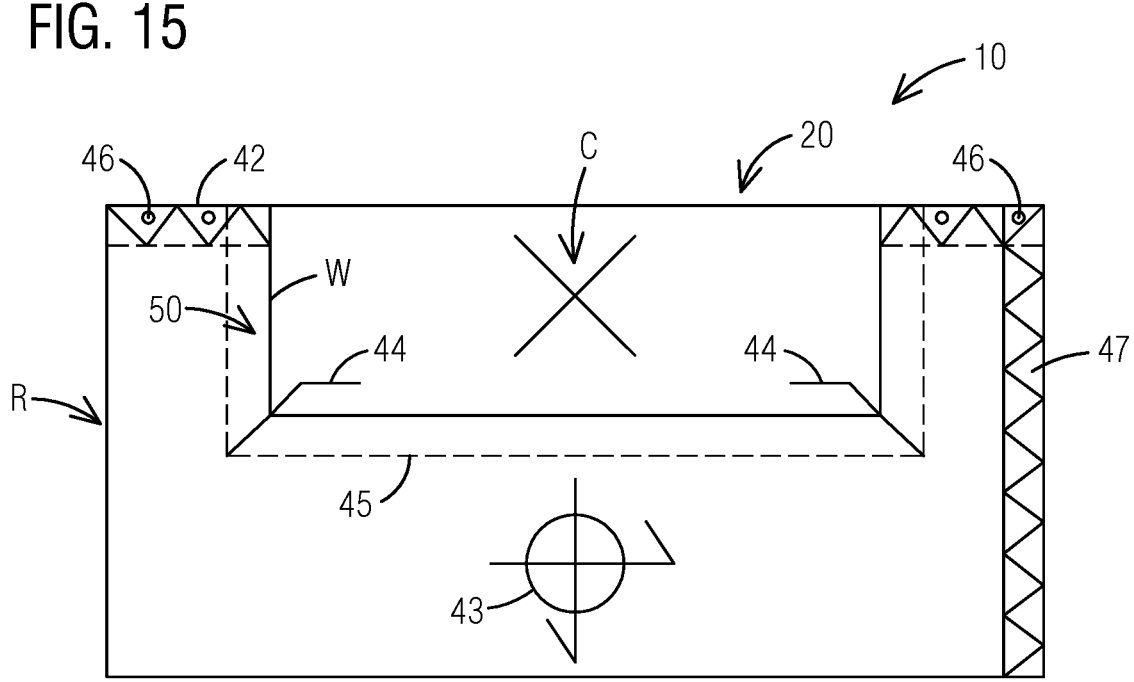
FIG. 15 is a top plan view of a roofing panel for a specific roof protrusion on a roof and incorporation bending and cutting instructions to form integrated flashing for the protrusion.

FIG. 14 illustrates a roofing panel 20 according to an embodiment of the present disclosure with a plurality of peripheral edges 41, and further including a variety of markings that guide an installer on how and where to install the panel, identify the panels and including markings including location initiators 43, and indicators of where to cut 44 and bend 45 the panel to form a desired integrated water shedding feature. Other indicator markings such as fastener targets 46, panel alignment markings or guides 47 and other installation instructions also can be provided. FIG. 15 illustrates a roofing panel 20 according to an embodiment of the disclosure. This roofing panel will be positioned on a roof R where it interfaces with a roof protrusion such as a chimney C. This embodiment is printed with instructions for cutting out sections and bending sections to form an integrated flashing 50 that embraces the walls of the chimney C.

The roofing panel system of the present disclosure has been described herein in terms of embodiments that exemplify various aspects thereof. It will be understood by the skilled artisan, however, that a wide gamut of additions, deletions, and modifications, both subtle and gross, may well be made to the illustrated embodiments. For example, roofing panels of the present disclosure may include surface embossing, photo printed surfaces, or surface layers for aesthetic purposes. Panel size(s) also may be optimized for ease of handling and installation. A non-limiting example is a rectangular panel size for instance may be 24 inches by 48 inches. In some embodiments, the panel size is 24 inches by 40 inches. In some other embodiments, the panel size is 24 inches by 36 inches; 30 inches by 36 inches; 30 inches by 40 inches; 30 inches by 48 inches; 36 inches by 40 inches; 36 inches by 48 inches; and/or other variations thereof. However, any size panel as dictated by application specific needs should be considered to fall within the scope of the invention.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present disclosure as set forth in the appended claims.

The invention claimed is:

1. A roof system, comprising:
a deck; and
a plurality of metal panels positioned on the deck; each of the metal panels comprising:
an upper surface;
a lower surface;
a plurality of peripheral edges; and
a plurality of sealant or adhesive regions positioned along the lower surface; and
wherein at least two of the plurality of sealant or adhesive regions are positioned adjacent to two of the peripheral edges;
an underlayment positioned between the deck and the plurality of metal panels;
wherein the metal panels are configured to be installed on the deck in predetermined positions based, at least in part, upon a roof geometry and at least one of a design requirement, a building code requirement, an installation practice, or combinations thereof;
wherein the roof comprises a sloped roof having a slope of at least 2:12;
wherein the metal panels are installed on the deck with the sealant or adhesive regions of the metal panels disposed in regions of overlap between adjacent metal panels so as to restrict migration of water between the adjacent metal panels.

2. The roof system of claim 1, further comprising instructions identifying a position at which each metal panel of the plurality of metal panels is to be installed on the deck.

3. The roof system of claim 2, wherein the instructions are applied along the lower surface of at least one of the plurality of metal panels.

4. The roof system of claim 1, wherein the underlayment comprises a weather resistant material.

5. The roof system of claim 1, wherein the at least two of the plurality of sealant or adhesive regions are arranged substantially perpendicular to each other.

6. The roof system of claim 1, further comprising instructions for installation of the metal roofing panels applied along the upper surface, the lower surface, or both the upper surface and lower surface of at least selected metal panels of the plurality of metal panels.

7. The roof system of claim 6, wherein at least some of the instructions comprise a map, diagram, directions, indicators or combinations thereof, and are configured to instruct an installer as to a metal panel type, a location, placement, or positioning of each metal panel or sets of metal panels along the roof, an installation order of the metal panels, an assigned roof plane for installation of the metal panels, horizontal or vertical offsets of the metal panels, placement of fasteners for securing the metal panels to adjacent metal panels, bending, cutting or manipulating portions of the metal panels for interaction with roof obstructions, or combinations thereof.

8. A roof assembly kit comprising:
a plurality of metal roofing panels, each metal roofing panel comprising:
an upper surface;
a lower surface;
a plurality of peripheral edges; and
a plurality of sealant or adhesive regions along the lower surface;
wherein the plurality of metal roofing panels are configured to be installed on a deck to form a roof in accordance with an assessment of a geometry for the roof;
wherein the roof comprises a sloped roof having a slope of at least 2:12; and
instructions for installation of each metal roofing panel of the plurality of metal roofing panels at a predetermined position on the roof based, at least in part, upon the geometry of the roof and at least one of a building code requirement, a design requirement, an installation practice, or combinations thereof;
wherein the metal roofing panels are configured to be installed on the deck with the sealant or adhesive regions of the metal roofing panels disposed in regions of overlap between adjacent metal roofing panels so as to restrict migration of water between the adjacent metal roofing panels.

9. The roof assembly kit of claim 8, wherein the instructions for installation of each of metal roofing panel is applied along a lower surface of at least one of the plurality of metal roofing panels.

10. The roof assembly kit of claim 8, wherein at least one of the sealant or adhesive regions of the metal roofing panels further comprises at least one self-seal strip positioned along the lower surface of each metal roofing panel adjacent a peripheral edge thereof; the at least one self-seal strip configured to attach the metal roofing panel to an upper surface of an adjacent metal roofing panel.

11. The roof assembly kit of claim 8, wherein at least some of the metal roofing panels of the plurality of metal roofing panels are sized for installation on the deck of the roof according to the predetermined position thereof.

12. The roof assembly kit of claim 11, wherein at least some of the plurality of metal roofing panels are sized at a site of installation of the roof.

13. The roof assembly kit of claim 8, wherein at least a portion of the plurality of metal roofing panels comprise a quantity of metal roofing panels formed with predetermined standard metal roofing panel configurations.

14. The roof assembly kit of claim 13, wherein the quantity of roofing panels and position of each metal roofing panel of the plurality of metal roofing panels is determined based, at least in part, on the geometry of the roof.

15. The roof assembly kit of claim 8, wherein the instructions for installation of each metal roofing panel comprise a plurality of markings applied along the upper surface, the lower surface or both the upper surface and lower surface of at least selected metal roofing panels of the plurality of metal roofing panels.

16. The roof assembly kit of claim 15, wherein the markings comprise permanent markings, non-permanent markings, or combinations thereof.

17. The roof assembly kit of claim 8, wherein the instructions for installation of each metal roofing panel comprise a plurality of non-permanent markings applied along at least one of the upper and lower surfaces of the metal roofing panels, and comprising a marking material configured to be removed upon exposure to weather.

18. The roof assembly kit of claim 8, wherein at least some of the instructions for installation of each metal roofing panel comprise a water soluble ink, a disappearing ink, a UV ink, or a combination thereof.

19. A roof assembly kit comprising:
a plurality of metal roofing panels, each metal roofing panel comprising:
an upper surface;
a lower surface;
a plurality of peripheral edges;
a plurality of sealant or adhesive regions along the lower surface; and
instructions for installation of each metal roofing panel of the plurality of metal roofing panels at a predetermined position along a deck of a roof based, at least in part, upon an assessment of a geometry of the roof and at least one of a building code requirement, a design requirement, an installation practice, or combinations thereof;
wherein the instructions for installation of each metal roofing panel comprise a plurality of markings applied along the upper surface, the lower surface, or both the upper surface and lower surface of at least selected metal roofing panels of the plurality of metal roofing panels;
wherein at least some of the markings of the plurality of markings comprise non-permanent markings;
wherein the metal roofing panels are configured to be installed on the deck with the sealant or adhesive regions of the metal roofing panels disposed in regions of overlap between adjacent metal roofing panels so as to restrict migration of water between the adjacent metal roofing panels.

20. The roof assembly kit of claim 19, wherein the non-permanent markings comprise a water soluble ink, a disappearing ink, a UV ink, or a combination thereof.

21. The roof assembly kit of claim 19, wherein at least some of the markings of the plurality of markings comprise a map, diagram, directions, indicators or combinations thereof, and are configured to instruct an installer as to a metal roofing panel type, a location, placement, or positioning of each metal roofing panel or sets of metal roofing panels along the roof, an installation order of the metal roofing panels, an assigned roof plane for installation of the metal roofing panels, horizontal or vertical offsets of the metal roofing panels, placement of fasteners for securing the metal roofing panels to adjacent metal roofing panels, bending, cutting or manipulating portions of the metal roofing panels for interaction with roof obstructions, or combinations thereof.

22. The roof assembly kit of claim 19, wherein at least some of the markings of the plurality of markings comprise permanent markings applied to at least one of the upper and lower surfaces on the metal roofing panels at locations so as to be substantially hidden after installation of the metal roofing panels on the roof.

23. The roof assembly kit of claim 19, wherein at least one of the sealant or adhesive regions of the metal roofing panels further comprises at least one self-seal strip positioned along the lower surface of each metal roofing panel, the at least one self-seal strip configured to attach the metal roofing panel to an upper surface of an adjacent metal roofing panel.

24. The roof assembly kit of claim 19, wherein at least some of the markings of the plurality of markings comprise permanent markings applied to the upper surfaces of the metal roofing panels and configured to imitate a traditional roofing material.

25. The roof assembly kit of claim 19, wherein the plurality of markings comprise permanent markings and non-permanent markings applied to the upper and lower surfaces on the metal roofing panels by photo printing, ink printing, imprinting, or a combination thereof; and wherein at least some of the non-permanent markings comprise a water soluble ink, a disappearing ink, a UV ink, or a combination thereof.

* * * * *